United States Patent
Davis et al.

(10) Patent No.: US 9,773,362 B2
(45) Date of Patent: Sep. 26, 2017

(54) DIRECTIONAL SENSING MECHANISM AND COMMUNICATIONS AUTHENTICATION

(71) Applicant: Assa Abloy AB, Stockholm (SE)

(72) Inventors: Masha Leah Davis, Austin, TX (US); Kevin Christopher Kraus, Monument, CO (US); Jason Raymond Williams, Atlanta, GA (US); Mark Anthony Caterino, Prospect, CT (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/644,499

(22) Filed: Mar. 11, 2015

(65) Prior Publication Data

US 2015/0187153 A1    Jul. 2, 2015

Related U.S. Application Data

(63) Continuation-in-part of application No. 14/148,329, filed on Jan. 6, 2014, which is a continuation of
(Continued)

(51) Int. Cl.
*G05B 19/00* (2006.01)
*G07C 9/00* (2006.01)
(Continued)

(52) U.S. Cl.
CPC ........ *G07C 9/00111* (2013.01); *G06F 1/1626* (2013.01); *G06F 1/1684* (2013.01);
(Continued)

(58) Field of Classification Search
CPC ............... G07C 9/00111; G06F 1/1626; G06F 1/1684; G06F 1/1694; G06F 1/1698; G06F 3/017
(Continued)

(56) References Cited

U.S. PATENT DOCUMENTS 5,116,010 A * 5/1992 McMasters ............... B60R 7/14
224/311
6,721,738 B2    4/2004 Verplaetse
(Continued)

FOREIGN PATENT DOCUMENTS

DE    10248389    8/2004
EP    1607723    12/2005
(Continued)

OTHER PUBLICATIONS

Notice of Acceptance for Australia Patent Application No. 2009279402, mailed Aug. 13, 2015 2 pages.
(Continued)

*Primary Examiner* — Kerri McNally
(74) *Attorney, Agent, or Firm* — Sheridan Ross P.C.

(57) ABSTRACT

The present invention is directed toward a communication device in communication with a motion sensing mechanism or other utility. The motion sensing mechanism or other utility is adapted to provide data to the communication device. The data is used to selectively allow or restrict the communication device's ability to transmit messages, which may include sensitive data, to a second electronic device. Thus, the motion sensing mechanism or other utility is utilized to limit access to data on the communication device to only instances when the utility provides the communication device with a recognized data input.

22 Claims, 5 Drawing Sheets

| Movement 1 | Movement 2 | Movement 3 | Action |
|---|---|---|---|
| ↓ | ← | ↓ | Allow Data To Be Read |
| ↑ | ⤵ 90 | | Allow Data To Be Read |
| ⤴ 90 | | | Allow Data To Be Read |
| ⤹ 90 X-axis | ⤹ 180 Y-axis | ↓ 180 Z-axis | Transmit Canned Message #1 of N |
| ↑ | → | ↑ | Provide Sequence As Password |

Related U.S. Application Data application No. 13/867,634, filed on Apr. 22, 2013, now Pat. No. 9,208,306, which is a continuation-in-part of application No. 13/179,198, filed on Jul. 8, 2011, now Pat. No. 8,427,320, which is a continuation of application No. 12/538,656, filed on Aug. 10, 2009, now Pat. No. 8,232,879.

(60) Provisional application No. 61/087,633, filed on Aug. 8, 2008.

(51) Int. Cl.

| | | |
|---|---|---|
| G06F 1/16 | (2006.01) | |
| G06F 21/31 | (2013.01) | |
| G06F 21/35 | (2013.01) | |
| G06F 21/36 | (2013.01) | |
| G06K 19/07 | (2006.01) | |
| G06K 19/073 | (2006.01) | |
| H04M 1/725 | (2006.01) | |
| G06F 3/0346 | (2013.01) | |
| G06F 3/01 | (2006.01) | |
| H04M 1/67 | (2006.01) | |

(52) U.S. Cl.
CPC ........ *G06F 1/1694* (2013.01); *G06F 1/1698* (2013.01); *G06F 3/017* (2013.01); *G06F 3/0346* (2013.01); *G06F 21/31* (2013.01); *G06F 21/316* (2013.01); *G06F 21/35* (2013.01); *G06F 21/36* (2013.01); *G06K 19/0716* (2013.01); *G06K 19/07336* (2013.01); *G06K 19/07345* (2013.01); *G07C 9/00071* (2013.01); *H04M 1/72519* (2013.01); *G06F 2200/1637* (2013.01); *H04M 1/67* (2013.01); *H04M 1/7253* (2013.01); *H04M 2250/12* (2013.01)

(58) Field of Classification Search
USPC ...................................................... 340/5.52
See application file for complete search history.

(56) References Cited

U.S. PATENT DOCUMENTS

| | | | |
|---|---|---|---|
| 6,891,475 B2 | 5/2005 | Bui et al. | |
| 7,084,769 B2 | 8/2006 | Bauer et al. | |
| 7,151,455 B2 | 12/2006 | Lindsay et al. | |
| 7,453,363 B2 | 11/2008 | Reynolds | |
| 7,679,604 B2 | 3/2010 | Uhlik et al. | |
| 7,724,705 B2 | 5/2010 | Erola et al. | |
| 7,956,725 B2 | 6/2011 | Smith | |
| 7,986,917 B2 | 7/2011 | Ahlgren et al. | |
| 8,232,879 B2 | 7/2012 | Davis | |
| 8,427,320 B2 | 4/2013 | Davis | |
| 8,488,900 B2 | 7/2013 | Conwell | |
| 8,542,186 B2 † | 9/2013 | Alameh | |
| 8,638,190 B1 | 1/2014 | Want et al. | |
| 9,501,880 B2 | 11/2016 | Handville et al. | |
| 9,501,883 B2 | 11/2016 | Handville et al. | |
| 2003/0132301 A1 | 7/2003 | Selker | |
| 2005/0079896 A1 | 4/2005 | Kokko et al. | |
| 2005/0189426 A1 | 9/2005 | Nishizawa et al. | |
| 2005/0212750 A1 | 9/2005 | Marvit et al. | |
| 2005/0253683 A1 | 11/2005 | Lowe | |
| 2006/0005156 A1 | 1/2006 | Korpipaa et al. | |
| 2006/0256074 A1* | 11/2006 | Krum | G06F 1/1626 345/156 |
| 2007/0180174 A1 | 8/2007 | Moosavi | |
| 2008/0039212 A1* | 2/2008 | Ahlgren | H04M 1/7253 463/46 |
| 2008/0172733 A1 | 7/2008 | Coriaty et al. | |
| 2008/0211622 A1 | 9/2008 | Rindtorff et al. | |
| 2008/0268931 A1 | 10/2008 | Alderucci et al. | |
| 2009/0066476 A1 | 3/2009 | Raheman | |
| 2010/0042954 A1 | 2/2010 | Rosenblatt et al. | |
| 2010/0207730 A1 | 8/2010 | Boursier et al. | |
| 2012/0124662 A1* | 5/2012 | Baca | G06F 21/32 726/17 |
| 2012/0161941 A1 | 6/2012 | Park et al. | |
| 2013/0234836 A1 | 9/2013 | Davis | |
| 2013/0288594 A1 † | 10/2013 | Yeh | |
| 2014/0118147 A1 † | 5/2014 | Davis | |
| 2015/0184963 A1* | 7/2015 | Milde, Jr. | F41A 17/066 42/70.06 |
| 2015/0363591 A1 | 12/2015 | Chen | |
| 2015/0365515 A1 | 12/2015 | Chen | |
| 2016/0226865 A1 | 8/2016 | Chen et al. | |
| 2017/0111348 A1 | 4/2017 | Davis | |

FOREIGN PATENT DOCUMENTS

| | | |
|---|---|---|
| EP | 2031548 | 3/2009 |
| JP | 2001-524904 | 12/2001 |
| JP | 2002-157050 | 5/2002 |
| JP | 2002-291047 | 10/2002 |
| JP | 2007-025957 | 2/2007 |
| JP | 2007-79665 | 3/2007 |
| JP | 2007-179169 | 7/2007 |
| JP | 2007-316981 | 12/2007 |
| JP | 2007-329815 | 12/2007 |
| JP | 2008-152525 | 7/2008 |
| JP | 2008-154004 | 7/2008 |
| KR | 100651268 | 11/2006 |
| TW | 201518983 | 5/2015 |
| WO | WO 98/45147 | 10/1998 |
| WO | WO 2008/007175 | 1/2008 |
| WO | WO 2008/029461 | 3/2008 |
| WO | WO 2009/027209 | 3/2009 |
| WO | WO 2009/147094 | 12/2009 |

OTHER PUBLICATIONS

Nmarquardt, "RFID Reader Detector and Tilt-Sensitive RFID Tag", available at http://www.instructables.com/id/RFID_Reader_Detector_and_Tilt_Sensitive_RFID_Tag/, Oct. 30, 2008, 15 pages.
International Search Report for International (PCT) Application No. PCT/US2009/053293, mailed Oct. 1, 2009.
Written Opinion for International (PCT) Application No. PCT/US2009/053293, mailed Oct. 1, 2009.
International Preliminary Report on Patentability for International (PCT) Patent Application No. PCT/US2009/053293, mailed Feb. 17, 2011.
Official Action for Canada Patent Application No. 2,733,522, mailed Jul. 9, 2012 2 pages.
Notice of Allowance for Canada Patent Application No. 2,733,522, mailed Apr. 24, 2013 1 page.
Official Action with English translation for China Patent Application No. 200980139812.1, dated Jan. 7, 2013 14 pages.
Official Action (with English translation) for China Patent Application No. 200980139812.1, dated Sep. 23, 2013, 19 pages.
Official Action (with English translation) for China Patent Application No. 200980139812.1, dated Apr. 15, 2014, 19 pages.
Official Action with English Translation for China Patent Application No. 200980139812.1, dated Dec. 29, 2014 19 pages.
Extended Search Report for European Patent Application No. 09805661.7, dated Jun. 28, 2012 6 pages.
Intention to Grant Patent for European Patent Application No. 09805661.7, dated Mar. 22, 2013 31 pages.
English Translation of Official Action for Japan Patent Application No. 2011-522307, mailed Feb. 26, 2013 5 pages.
Official Action with English Translation for Japan Patent Application No. 2011-522307, mailed Dec. 3, 2013 9 pages.
Official Action with English Translation for Japan Patent Application No. 2011-522307, mailed Dec. 16, 2014 6 pages.
Official Action with English Translation for Japan Patent Application No. 2013-168130, dated Dec. 3, 2013 6 pages.

(56) References Cited

OTHER PUBLICATIONS

Official Action with English Translation for Japan Patent Application No. 2013-168130, mailed Dec. 16, 2014 8 pages.
Official Action with English Translation for Korea Patent Application No. 10-2011-7005331, mailed Oct. 13, 2014 12 pages.
Official Action for U.S. Appl. No. 12/538,656, mailed Nov. 2, 2011 28 pages.
Official Action for U.S. Appl. No. 13/179,198, mailed Nov. 7, 2011 20 pages.
Notice of Allowance for U.S. Appl. No. 12/538,656, mailed Feb. 28, 2012 10 pages.
Official Action for U.S. Appl. No. 13/179,198, mailed May 9, 2012 8 pages.
Notice of Allowance for U.S. Appl. No. 13/179,198, mailed Sep. 6, 2012.
Notice of Allowance for U.S. Appl. No. 13/179,198, mailed Nov. 2, 2012, 7 pages.
Official Action for U.S. Appl. No. 13/867,634, mailed Feb. 4, 2015 20 pages.
Official Action for U.S. Appl. No. 14/148,329, mailed Feb. 5, 2015 22 pages.
Examination Report for Australia Patent Application No. 2009279402, dated Feb. 20, 2014 4 pages.
Notice of Allowance with English Translation for Korea Patent Application No. 10-2011-7005331, dated Mar. 30, 2015 3 pages.
Official Action for U.S. Appl. No. 13/867,634, mailed Jun. 17, 2015 24 pages.
Official Action for U.S. Appl. No. 14/148,329, mailed Jun. 17, 2015 31 pages.
Notice of Allowance for U.S. Appl. No. 13/867,634, mailed Aug. 3, 2015 5 pages.
Notice of Reexamination with English Translation for China Patent Application No. 2009801398121, dated Dec. 14, 2015 26 pages.
Official Action with English Translation for Japan Patent Application No. 2013-168130, mailed Jan. 5, 2016 8 pages.
Official Action for U.S. Appl. No. 14/148,329, mailed Dec. 10, 2015 21 pages.
Official Action for U.S. Appl. No. 14/148,329, mailed Jun. 10, 2016 17 pages.
Notice of Allowance for U.S. Appl. No. 14/148,329, mailed Aug. 19, 2016 5 pages.
Official Action (English Translation) for Japan Patent Application No. 2013-168130, dated Jan. 10, 2017 6 pages.
Notice of Allowance for Japan Patent Application No. 2013-168130, dated Jun. 13, 2017 2 pages.

\* cited by examiner
† cited by third party

DIRECTIONAL SENSING MECHANISM AND COMMUNICATIONS AUTHENTICATION

CROSS-REFERENCE TO RELATED APPLICATIONS

This application is a Continuation-In-Part of U.S. patent application Ser. No. 14/148,329, filed Jan. 6, 2014, which is a continuation of U.S. patent application Ser. No. 13/867,634, filed Apr. 22, 2013, which is a Continuation-In-Part of U.S. application Ser. No. 13/179,198, filed Jul. 8, 2011, now U.S. Pat. No. 8,427,320, which is a Continuation of U.S. patent application Ser. No. 12/538,656, filed Aug. 10, 2009, now U.S. Pat. No. 8,232,879, which claims the benefit of U.S. Provisional Patent Application Ser. No. 61/087,633, filed Aug. 8, 2008, the entire disclosures of which are hereby incorporated herein by reference.

FIELD OF THE INVENTION

The present invention is generally directed to the detection of card movement and the utilization of said detection information as well as other information in connection with controlling operation of a communication device.

BACKGROUND

Radio Frequency Identification (RFID) systems use an RFID reader to wirelessly detect the presence of a nearby RFID tag and read an identification code stored in the tag. The identification code in the RFID tag can be used to control access to a protected resource by allowing access only when an RFID tag having an authorized identification code is detected. Generally, the authorized RFID tag is issued to an authorized user to ensure that only the authorized user has access to the protected resource. If the authorized RFID tag is lost or stolen, however, it can be presented by an unauthorized user to access the protected resource.

Presently available installed RFID systems use a variety of different complex coding and signaling methods, some of which are proprietary. The RFID tags used with these systems take two forms—cards and key fobs. The coding that these leased programmers can embed is limited to certain specific ranges and formats allowed by each of the distributors and controlled by an encrypted media, which is supplied by each of the companies.

There are proposals to integrate RFID devices into banknotes, credit cards, debit cards, store loyalty cards and other high-value objects in an attempt to prevent fraud. The thought is that a person carrying an object with all of the authentication information must be the true object owner. As more and more objects are equipped with these RFID devices, the chances of having one's personal information stolen from them increases. High-value objects integrated with RFID devices typically carry extremely sensitive information (e.g. social security numbers, addresses, bank account numbers, ATM pin codes, names, etc.) If this type of information is stolen, the entire identity of the object holder may be compromised. This poses a very serious threat to the general population carrying objects equipped with an RFID device.

SUMMARY

It is, therefore, one aspect of the present invention to provide an RFID device that restricts data transmissions until it has been moved in a particular way by the holder of the RFID device. By requiring the holder of the device to move the RFID device in a certain way before releasing its sensitive data, the RFID device potentially limits its use, and therefore release of sensitive data, to instances where an authorized user is actually presenting the card purposefully to a reader (assuming that an unauthorized user does not know the predetermined motion sequence that unlocks the sensitive data from the RFID device). This helps minimize or completely prevent third parties from stealing data from the RFID device unless the holder of the RFID device is moving it in the predetermined sequence of motions. In other words, an attacker is restricted from illicitly passing a reader in proximity to the user's RFID device to harvest data from the user without their consent.

In accordance with at least one embodiment of the present invention, an RFID device is equipped with a directional sensing mechanism such as a Micro-Electro-Mechanical System (MEMS) or accelerometer that is capable of sensing movement of the RFID device in one or more directions and/or rotations of the RFID device in one or more rotational directions. The present invention is generally directed toward a method, apparatus, and system that utilizes a directional sensing component in combination with an RFID device to substantially prohibit illicit data harvesting from RFID devices. As can be appreciated, an RFID device can be implemented as a part of an ID/access card, smart card, RF tag, cellular phone, Personal Digital Assistant (PDA), key fob, and the like.

In accordance with one embodiment of the present invention, a system is provided that substantially prevents the illegitimate harvesting of data from an RFID device. The data may have degrees of sensitivity. For example, highly sensitive data may include, but is not limited to, bank account numbers, social security numbers, PIN codes, passwords, keys, RFID unique ID, encryption schemes, etc. Less sensitive data may include, but is not limited to, user name, manufacturer ID, job title, and so on.

MEMS are the integration of mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices.

MEMS are capable of bringing together silicon-based microelectronics with micromachining technology, making possible the realization of complete systems-on-a-chip. MEMS is an enabling technology allowing the development of smart products, augmenting the computational ability of microelectronics with the perception and control capabilities of microsensors and microactuators and expanding the space of possible designs and applications.

Because MEMS devices are manufactured using batch fabrication techniques similar to those used for integrated circuits, unprecedented levels of functionality, reliability, and sophistication can be placed on a small silicon chip at a relatively low cost.

In accordance with at least some embodiments of the present invention, the MEMS device may be provided as an integral part of the processing chip that is also used to control the RF communication functionality of the RFID device. More specifically, a single chip may be responsible for executing the traditional processing of the RFID device as well as controlling whether the RFID device is allowed to respond to a request for data from a reader (or even enable the antenna to respond to any type of RF field). Unless the proper sequence of motions (e.g., rotations, sliding motions, etc.) is detected by the MEMS device the processor will not be allowed to reveal any sensitive data from its storage location on the RFID device. In accordance with at least one embodiment of the present invention, a switch (e.g., logical switch, mechanical switch, electromechanical switch, electrical switch, or the like) may be provided on the RFID device that inhibits the RFID device from responding to any energization by a reader or the like unless the predetermined motion or sequence of motions are detected at the RFID device. Thus, the RFID device is enabled to unilaterally control whether it provides any data to a requesting source based on whether the predetermined motion has been detected.

In accordance with at least some embodiments of the present invention, passwords could also be entered by a user of the RFID device by using a combination lock metaphor. For example, a password could correspond to rotating the RFID device right, then back to original position, then right, etc. Thus, while the password combination is used to enable the RFID device to transmit data to a reader, the RFID device may also send the results of the detected motion (i.e., the RFID device may send the reader the combination of right-return-right, likely as binary data). The reader may then analyze the motion information as an additional password for verifying the identity of the RFID device and the holder of the RFID device. If either the card information or the motion-based-password is not valid, then the reader may determine that the RFID device is not granted access to the asset protected by the reader. Thus, the password provided to the reader as a result of detecting motion may be used to represent something that the user knows in addition to the thing (RFID device) the user is carrying, thereby providing two layers of security.

This two layer security paradigm can be implemented with a traditional reader that does not necessarily have a keypad. If a user's card is lost or compromised, it will be unusable by another user who does not know the motion-based password.

In accordance with further embodiments of the present invention, the "motion information" captured by the directional sensing mechanism may also correspond to certain messages (e.g., a table may be provided mapping certain sequences of motion to certain messages). Accordingly, the RFID device may either send the corresponding message or the captured motion information to the reader where it is analyzed. The message may, for example, indicate that the holder of the RFID device is under duress. As can be appreciated by one skilled in the art, other sequences of motions may be mapped to different messages to provide other indicia about the holder of the RFID device. In some embodiments the table may be maintained in the RFID device. In some embodiments the table may be maintained in the reader. In some embodiments, the table may be maintained in a combination of the RFID device and the reader.

In accordance with yet other embodiments of the present invention, the directional sensing mechanism may operate in conjunction with other sensors, timers, or systems to provide additional layers of security and/or convenience. For example, the directional sensing mechanism may operate in conjunction with a timer, a pedometer, a Global Positioning System unit or other location sensor, a microphone, and so forth to impose additional parameters (e.g. relating to time, movement, location, voice, etc.) on the release of sensitive data by the RFID device. These other information sources may be, as non-limiting examples, located on a portable electronic device or on an auxiliary device in wireless communication with a portable electronic device.

In accordance with still further embodiments of the present invention, the integration of a directional-sensing mechanism onto a chip can be leveraged in other applications, such as in mobile communication and cellular phone applications. More specifically, a SIM card or similar processing platform may be adapted to include a directional-sensing mechanism that acts as an input to the card. Thus, a user of the mobile communication device may be allowed to control the operation of the mobile communication device (e.g., make call, answer call, reject call, etc.) by simply shaking the mobile communication device or by moving the mobile communication device in a predetermined pattern of motion. In still further embodiments, a user can simply shake or tap their mobile device when they are on a call with another user or when they are busy doing something else (e.g., during a meeting). The shaking or tapping of the mobile device may cause the mobile device to generate a predetermined text message which is transmitted back to the caller, informing the caller that the intended recipient of the message is busy and will call back later. In other embodiments, a user may be allowed to locate the menu of services and applications provided on the mobile device by simply shaking or tapping the mobile device.

In still other embodiments a combined accelerometer and gyroscope unit is provided that generally comprises: a proof mass; primary actuating means operable to actuate the proof mass along a primary axis; secondary actuating means operable to actuate the proof mass along a secondary axis; secondary sensing means operable to sense the position of the proof mass along the secondary axis; and primary sensing means operable to sense the position of the proof mass along the primary axis wherein $\Sigma\Delta$ force-feedback loops are set up for both the secondary axis and the primary axis.

It is another aspect of the present invention to provide a combined accelerometer and gyroscope unit wherein the accelerometer and gyroscope unit is a MEMS accelerometer and gyroscope unit.

It is another aspect of the present invention to provide a combined accelerometer and gyroscope unit wherein both the primary actuating means and the primary sensing means are comb-drive capacitors.

It is another aspect of the present invention to provide a combined accelerometer and gyroscope unit wherein separate comb-drive capacitors are provided for actuating and for readout.

It is another aspect of the present invention to provide a combined accelerometer and gyroscope unit wherein time multiplexing is used to allow the same comb-drive capacitors to be utilised both for actuating and for readout.

It is another aspect of the present invention to provide a combined accelerometer and gyroscope unit wherein both the secondary actuating means and the secondary sensing means are differential parallel plate capacitors.

It is another aspect of the present invention to provide a combined accelerometer and gyroscope unit wherein separate differential parallel plate capacitors are provided for actuating and for readout.

It is another aspect of the present invention to provide a combined accelerometer and gyroscope unit wherein time multiplexing is used to allow the same differential parallel plate capacitors to be utilised both for actuating and for readout.

It is another aspect of the present invention to provide a combined accelerometer and gyroscope unit wherein separate ΣΔ force-feedback loops are provided for the primary mode and the secondary mode.

It is another aspect of the present invention to provide a combined accelerometer and gyroscope unit wherein the primary loop has an extra input Vjn.

It is another aspect of the present invention to provide a combined accelerometer and gyroscope unit wherein each loop incorporates an electrical filter.

It is another aspect of the present invention to provide a combined accelerometer and gyroscope unit wherein at the end of each loop, a quantizer is provided to deliver digital output values.

It is another aspect of the present invention to provide a combined accelerometer and gyroscope unit wherein each loop contains a mechanical feedback path.

It is another aspect of the present invention to provide a combined accelerometer and gyroscope unit wherein an electrical feedback path is also provided.

It is another aspect of the present invention to provide a combined accelerometer and gyroscope unit as claimed in claim 14 wherein the electrical feedback loops are provided with additional electrical filters.

It is another aspect of the present invention to provide a combined accelerometer and gyroscope unit wherein each additional filter has the same poles as the first filters.

It is another aspect of the present invention to provide a combined accelerometer and gyroscope unit wherein each additional filter has different zeros to the first filters.

It is another aspect of the present invention to provide a combined accelerometer and gyroscope unit wherein an extra controller filter is provided to stabilize the loop.

It is another aspect of the present invention to provide a combined accelerometer and gyroscope unit wherein the unit is further provided with tertiary actuating means operable to actuate the proof mass along a tertiary axis and/or tertiary sensing means operable to sense the position of the proof mass along the tertiary axis.

It is another aspect of the present invention to provide a combined accelerometer and gyroscope unit wherein the tertiary axis is substantially perpendicular to the plane containing the primary and secondary axes.

It is another aspect of the present invention to provide a combined accelerometer and gyroscope unit wherein both the tertiary actuating means and the tertiary sensing means are comb-drive capacitors.

It is another aspect of the present invention to provide a combined accelerometer and gyroscope unit wherein separate comb-drive capacitors may be provided for actuating and for readout.

It is another aspect of the present invention to provide a combined accelerometer and gyroscope unit wherein time multiplexing may be used to allow the same comb-drive capacitors to be utilised both for actuating and for readout.

It is another aspect of the present invention to provide a combined accelerometer and gyroscope unit wherein the two sets of fingers comprising the comb-drive capacitors may be of differing dimensions along the tertiary axis.

It is another aspect of the present invention to provide a combined accelerometer and gyroscope unit wherein the unit is operated in a mode wherein a ΣΔ force-feedback loop is set up for only one of the secondary axis and the primary axis.

It is another aspect of the present invention to provide a sensor cluster comprising one or more combined accelerometer and gyroscope units.

It is another aspect of the present invention to provide a sensor cluster wherein the cluster may additionally comprise one or more dedicated single axis or multi-axis accelerometers and/or one or more dedicated single axis or multi-axis gyroscopes.

It is another aspect of the present invention to provide a method of operating a combined accelerometer and gyroscope unit having a proof mass; primary actuating means operable to actuate the proof mass along a primary axis; secondary actuating means operable to actuate the proof mass along a secondary axis; secondary sensing means operable to sense the position of the proof mass along the secondary axis; and primary sensing means operable to sense the position of the proof mass along the primary axis, the method comprising the steps of: setting up ΣΔ force-feedback loops for the both the secondary axis and the primary axis to measure both a component of rotation and two components of acceleration.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figure 1:
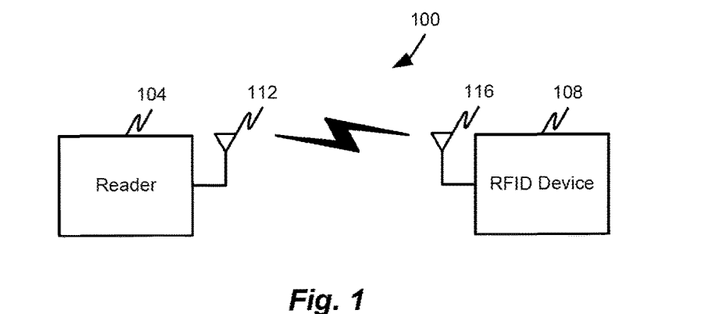
FIG. 1 is a block diagram depicting an access control system in accordance with at least some embodiments of the present invention.

Referring initially to FIG. 1, an illustrative access control system 100 is depicted in accordance with at least some embodiments of the present invention. The access control system 100 may comprise a reader 104 and an RFID device 108. The RFID 108 may be a passive device which does not require power supplied from an internal power source. The electrical power required to operate a passive tag is supplied to the tag by electromagnetic energy transmitted from the reader 104. The electromagnetic energy may be generated at an antenna 112 of the reader 104 and received at an antenna 116 of the RFID device 108. In accordance with at least some embodiments of the present invention, the antenna 116 (or the entire antenna circuit) may not be allowed to respond to the electromagnetic energy generated by the reader 104 if the RFID device 108 has not been moved in a predefined motion of predefined sequence of motions.

Accordingly, a passive RFID device 108 is operational when it receives electromagnetic waves from the reader 104 and has been moved in a predefined motion. As can be appreciated, however, the RFID device 108 may alternatively be an active device which has some form of internal power supply (e.g., a battery or a similar energy storage device). In this particular embodiment, the battery may be disconnected from the antenna or some other portion of the RFID device 108 unless the RFID device 108 has been moved in a predefined motion.

Figure 2:
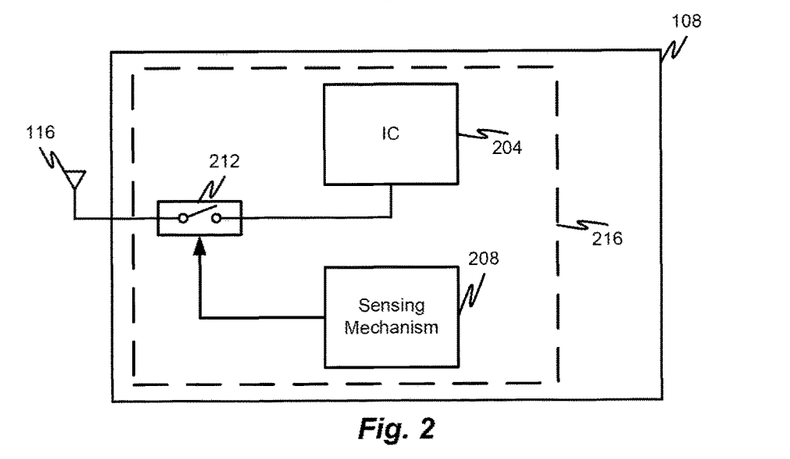
FIG. 2 is a block diagram depicting an RFID device in accordance with at least some embodiments of the present invention.

Referring now to FIG. 2, the RFID device 108 may comprise a number of functional elements including an integrated circuit (IC) 204 that is connected to the device's antenna 116. The IC 204 embodies the processing and memory capabilities of the RFID device 108. The RFID device's antenna 116 is typically coupled to the IC 204 and may be a conventional coil termed a "dual-function antenna coil" which is capable of performing both the receiving and transmitting functions of the RFID device 108. Alternatively, two separate receiving and transmitting antenna coils can be substituted for the single "dual function antenna coil" in the RFID device 108. The RFID device 108 may also optionally include an external transponder tuning capacitor coupled to the IC and to each antenna coil of the tag's antenna 116. Further details of the RFID device circuitry are described in U.S. patent application Ser. No. 10/847,542 to Lowe, the entire contents of which are hereby incorporated herein by reference.

The RFID device's antenna 116, in cooperation with the transponder tuning capacitor, if present, may be used to determine the carrier frequency of the RFID device 108. In accordance with at least some embodiments of the present invention, the RFID device 108 may be equipped to communicate at a number of different carrier frequencies including, without limitation, 125 kHz, 13.56 MHz, etc. Alternatively or additionally, the RFID device 108 may be configured to communicate via NFC and/or Bluetooth (e.g., Bluetooth 4).

The RFID device 108 shown and described herein is but one example of a type of transponder having utility in the RFID system 100. It is understood that practice of the present invention is not limited to any one specific type of tag, but is generally applicable to most conventional types of tag having utility in RFID systems. Thus, for example, the tag can be selected from proximity cards, proximity tags, smart cards, NFC devices, or the like. It is further understood that practice of the present invention is not limited to RFID systems having only one tag and one reader as shown and described, but is generally applicable to RFID systems having any number of compatible tags/machine readable credentials and readers.

Furthermore, the RFID device 108 may be provided in a number of different form factors. For example, the RFID device 108 may be provided on or within a card as described above. Additionally, the RFID device 108 may be provided on or within a key fob, portable electronic device (e.g., laptop, Personal Digital Assistant (PDA), portable e-mail retrieval device, cellular phone, etc.), any other device including a SIM card containing one of its ICs, a computer, a phone, or any other generally portable device. Many such devices include clocks, timers, accelerometers, GPS and/or other location-sensing functionality, microphones, and other tools or sensors that can be used in conjunction with the systems and methods described herein to create additional layers of security and/or to improve user convenience.

In most conventional RFID systems, the position of the reader 104 is stationary (i.e., constant) relative to the surrounding environment, while the position of the RFID device 108 is portable (i.e., variable) within the surrounding environment. In such cases, the user of the RFID system moves the portable RFID device 108 into relative proximity with the stationary reader 104 to enable simultaneous operation of both the RFID device 108 and the reader 104. In some conventional RFID systems, however, the position of the reader 104 may be portable relative to the surrounding environment, while the position of the RFID device 108 is either portable or stationary. In the case of a portable reader 104 and a stationary RFID device 108, the user moves the portable reader 104 into relative proximity with the stationary RFID device 108 to enable simultaneous operation of both the RFID device 108 and the reader 104. In the case of a portable reader 104 and a portable RFID device 108, the user may move both the portable reader 104 and the portable RFID device 108 into relative proximity with one another to enable simultaneous operation of both the RFID device 108 and the reader 104. Embodiments of the present invention are not limited to any one of the above-recited RFID system configurations.

As can be seen in FIG. 2, the RFID device 108 may further include a directional sensing mechanism 208 that is coupled to a switch 212. The switch 212 may control the overall operational abilities of the RFID device 108. More specifically, the switch 212 may be enabled to disconnect the IC 204 of the RFID device 108 from the antenna 116. Alternatively, the switch 212 may be enabled to disconnect the IC 204 from an external memory that contains sensitive data. In yet another alternative embodiment, the switch 212 may be enabled to disable the antenna 116 entirely. In still another alternative embodiment, the switch 212 may be enabled to disable or otherwise directly control the operation of the IC 204 (i.e., the switch 212 may be integral to the IC 204). In other words, the switch 212 may comprise a logical switch that is simply a rule set implemented by the IC 204 when a particular signal is received at the IC 204 from the directional sensing mechanism 208.

As can be seen in FIG. 2, the IC 204, sensing mechanism 208, and/or switch 212 may be provided on a single piece of silicon 216 residing in the RFID device 108. Alternatively, just the IC 204 and sensing mechanism 208 may be provided on the single piece of silicon 216. Still further in the alternative, each component may be provided on separate pieces of silicon.

As a default state, the switch 212 may not allow the RFID device 108 to transmit any data (including sensitive data) from the antenna 116. When an "activating" predetermined motion or sequence of motions is detected at the sensing mechanism 208, the switch 212 may be moved from its default state and the RFID device 108 may then be allowed to transmit sensitive data.

Once the RFID device 108 is enabled to transmit data, the IC 204 may be enabled to retrieve sensitive data from its location of storage, generate a message containing said data, then transmit said message to the reader 104 via its antenna 116.

In accordance with at least some embodiments and as noted above, the present invention is not limited to use in RFID technologies or controlling such technologies. Rather, embodiments of the present invention may be applied to SIM cards containing one or more ICs or other ICs residing in a mobile communication device. A directional sensing mechanism 208 may be employed to control the operation of the SIM card or IC of the mobile communication device. As one example, the directional sensing mechanism 208 may be utilized to limit the operation of the SIM card or IC. As another example, the directional sensing mechanism 208 may be used to provide a control input to the SIM card or IC such that operations of the SIM card or IC are based on motions of the mobile communication device sensed by the directional sensing mechanism 208. This may allow a user of the mobile communication device to control the operation of the mobile communication device by simply shaking the mobile communication device or moving it in a predetermined fashion or according to a predetermined sequence of motions. A different set of motions or sequence of motions may be used as different control inputs to the SIM card or IC. As one example, a rotation of the mobile device to the left may correspond to an input which causes the SIM card or IC to perform one action whereas a rotation of the mobile device to the right may correspond to a different input which causes the SIM card or IC to perform another different action.

As another example, a user may originate a call via the antenna 116 to a remote destination (e.g., via cellular communication technologies) and a predetermined phone number by simply shaking or tapping the mobile device. This allows the user to control the operations of the mobile device and certain applications residing therein by simply moving or shaking the mobile device. This may allow the creation of a mobile communication device that does not necessarily need a handset or keypad. In other words, the SIM card of the mobile device may be handset independent and can simply be controlled by the shaking or tapping of the mobile device and subsequent detection of motion by the directional sensing mechanism 208.

Figure 3:
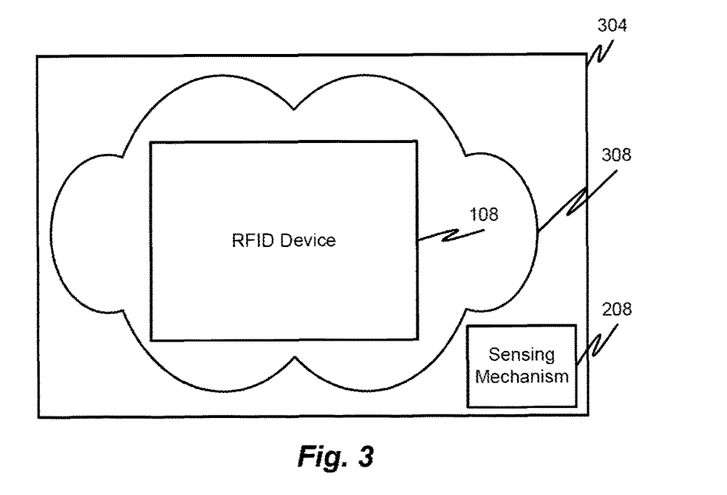
FIG. 3 is a block diagram depicting an alternative configuration of an RFID device holder in accordance with at least some embodiments of the present invention.
Figure 4:
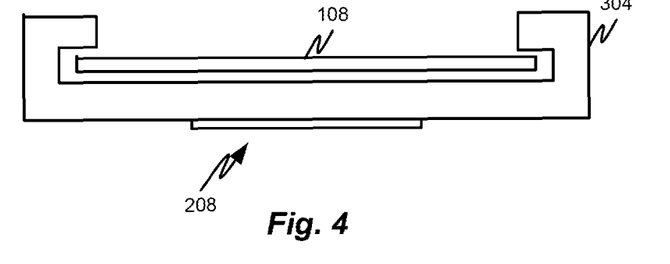
FIG. 4 is a block diagram depicting a cross-sectional view of an RFID device contained with a holder that actively cancels RF communications unless a predetermined motion or sequence of motions is detected by the holder in accordance with at least some embodiments of the present invention.

FIGS. 3 and 4 depict an alternative mechanism that may be used to protect sensitive data stored on an RFID device 108. More specifically, rather than "enabling" the RFID device 108 to transmit sensitive data only when a predetermined motion or sequence of motions is detected by a sensing mechanism 208, it may be possible to employ a card carrying device 304 that generates an active cancellation field 308 which is intended to distort any data transmission of the RFID device 108. More specifically, the holder 304 may comprise a separate antenna and IC that are adapted to be activated when carried into an RF field. If an RFID device 108 is also in the holder when an RF field is applied thereto, both the antennae in the holder and an antenna in the RFID device 108 will attempt to transmit messages. The signal transmitted by the holder 304 is used to create noise thereby making it difficult or impossible to retrieve the data transmitted by the RFID device 108. If a user desires to have their RFID device read by a reader, the user is traditionally required to remove the RFID device 108 from the holder 304 so that the cancellation field 308 is not generated.

Embodiments of the present invention propose incorporating a sensing mechanism 208 in the holder 304 rather than the RFID device 108 so that privacy protection techniques described herein can be used to protect data on older legacy RFID devices 108 that do not have a directional sensing mechanism 208. In accordance with at least some embodiments of the present invention, a user can allow data from the RFID device 108 to be read by moving the holder 304 in a predetermined motion or sequence of motions to temporarily deactivate the cancellation field 308. This allows the RFID device 108 to be the only antenna which responds to the reader. This can all be accomplished without requiring a user to remove the RFID device 108 from the holder 304.

As can be seen in FIG. 4, the holder 304 may have a preferred geometry for physically securing the RFID device 108. The directional sensing mechanism 208 may be provided on a printed circuit board or the like that resides on the back side of the card holder 304. The directional sensing mechanism 208 may operate in a normal fashion, but instead of enabling operations of the holder 304 when a predetermined motion or sequence of motions is detected, the directional sensing mechanism 208 may disable operations of the holder 304 for a predetermined amount of time.

Figure 5:
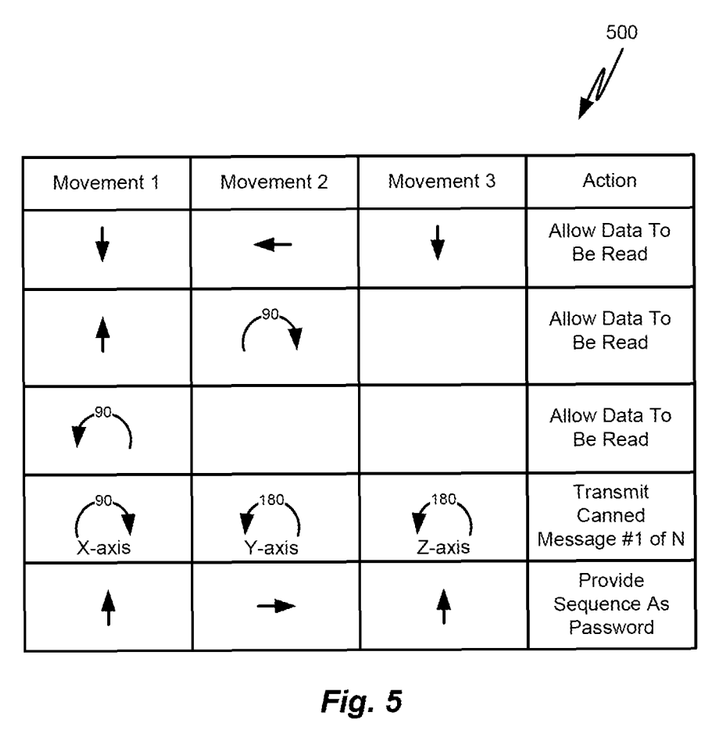
FIG. 5 is a table depicting exemplary motions and their associated actions in accordance with at least some embodiments of the present invention.

With reference now to FIG. 5, an exemplary motion table 500 used to translate motions into actions will be described in accordance with at least some embodiments of the present invention. As can be seen, rotational movements across one, two, or three axes may be used to protect data on an RFID device 108 or at least control the operation of the RFID device 108. Additionally, sliding movements may also be considered as a motion input. When a predetermined motion or sequence of motions is detected, an action is performed in conformity with the actions listed in the table 500. As one example, the motion or sequence of motions may result in an action which allows the RFID device 108 to transmit sensitive data to a reader. As another example, the motion or sequence of motions may result in the generation and transmission of a predetermined message. As yet another example, the motion or sequence of motions may cause the IC 204 to translate the motions into binary data which can be transmitted as a password to the reader 104 alone or in addition to other sensitive data stored on the RFID device 108. The reader 104 can then analyze the password to determine if user access is permitted. The password may be used as a metaphor or substitution of a user input which would otherwise need to be provided to a keypad on the reader 104. Accordingly, a reader 104 without a keypad can test what the user is carrying as well as what the user knows, thereby resulting in a substantially more secure facility.

In accordance with at least some embodiments of the present invention an enrollment process is provided whereby a user is allowed to define their personal motion or sequence of motions that will be used to protect the data on the RFID device 108. In one embodiment, the user may be allowed to sit in front of a reader connected to a computer providing the user with a Graphical User Interface. The reader may prompt the user to enter their motion-based password and will then wait for the detection of a motion or series of motions. Once the user has performed the desired motion(s), the user may indicate that they are done and the reader/computer will replay the detected motion or sequence of motions and ask the user if that is their desired password. If the user selects yes, then the entries in the table 500 may be updated accordingly. Also, the password data may be provided back to the RFID device 108 or at least an affirmation is sent to the RFID device 108 indicating that the last motion or sequence of motions corresponds to a password entered and recognized by the reader.

In accordance with at least some alternative embodiments of the present invention, the motion-based password may also be used to protect non-RF devices. As an example, an RSA card may be secured with a directional sensing mechanism 208 performing operations as described herein. Unless a predetermined motion or sequence of motions is detected at the RSA card, then the RSA card may be prohibited from generating a code for the user.

Figure 6:
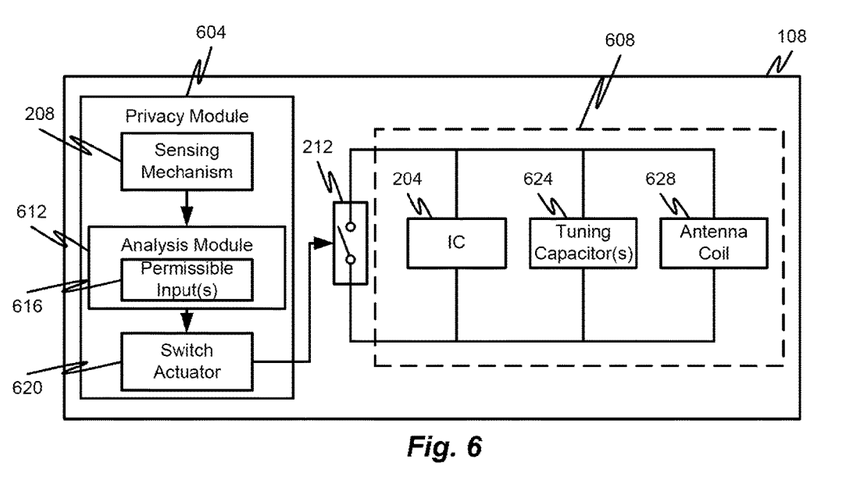
FIG. 6 is a block diagram depicting another illustrative RFID device in accordance with embodiments of the present disclosure.

With reference now to FIG. 6, an alternative configuration of an RFID device 108 will be described in accordance with embodiments of the present disclosure. The RFID device is similar to the RFID device 108 of FIG. 2 in that a sensing mechanism 208 is used to actuate or control the operations of a switch 212 that effectively controls the RFID device's ability to establish RF communications with other devices. In particular, the RFID device 108 is shown to include a transponder module 608 and a privacy module 604.

In some embodiments, the privacy module 604 comprises the sensing mechanism 208, an analysis module 612, and a switch actuator 620. The transponder module 608 is shown to include an IC 204 (possibly having sensitive data), a tuning capacitor 624, and an antenna coil 628. The antenna coil 628 may be similar or identical to the antennas 116 previously discussed herein.

The transponder module 608 may behave and operate much like a traditional RF transponder (e.g., via inductive or RF coupling). The privacy module 604 may comprise any collection of software, firmware, microprocessors, or the like that are capable of detecting one or more predetermined motions at the sensing mechanism 608, analyzing the motions detected at the sensing mechanism with the analysis module 612, and depending upon the analysis of the motions, invoking the switch actuator 620. As a non-limiting example, the privacy module 208 may all be built on a single piece of silicon or the sensing mechanism 208 may be incorporated into a microprocessor that is also executing the analysis module 612. As another non-limiting example, the analysis module 612 may be software instructions executed by a microprocessor, firmware instructions, and/or a digital logic circuit (e.g., ASIC) that is configured to operate the switch actuator 620 only in response to receiving one or more permissible inputs 616 from the sensing mechanism 208.

The privacy module 604 is coupled to the transponder module 608 via the switch 212 (which may actually contain one or more switches). The switch 212 may be physically or mechanically operated by the switch actuator 620. When the switch 212 is in a first position (e.g., open or closed), the IC 204 may be configured to exchange RF communications with other RF-enabled devices via the antenna coil 628. When the switch 212 is in a second position (e.g., an opposite position to the first position), the IC 204 may effectively be prohibited from exchanging RF communications via the antenna coil 628. In some embodiments, an open position of the switch 212 may enable the IC 204 to establish communications via the antenna coil 624 whereas a closed position of the switch 212 may effectively short the antenna 628, thereby prohibiting the IC 204 from establishing RF communications via the antenna coil 624. Because the privacy module 604 is enabled to control the switch 212 via the switch actuator 620, the privacy module 604 may be configured to effectively interrupt, short, or otherwise interfere with the operations of the transponder module 608. Accordingly, unless an appropriate permissible input 616 is received at the sensing mechanism 208 and recognized by the analysis module 612, the transponder module 608 may be prohibited from exchanging RF communications. Said another way, credentials or other sensitive information stored on the IC 204 may only be released when the permissible input(s) 616 are received at the sensing mechanism 208 (e.g., when predetermined directional motions of the RFID device 108 occur).

In some embodiments, the switch 212 can be incorporated into the transponder module 608 and/or the privacy module 604. In some embodiments, the switch actuator 620 may be incorporated into the transponder module 608 instead of the privacy module 604.

Figure 7:
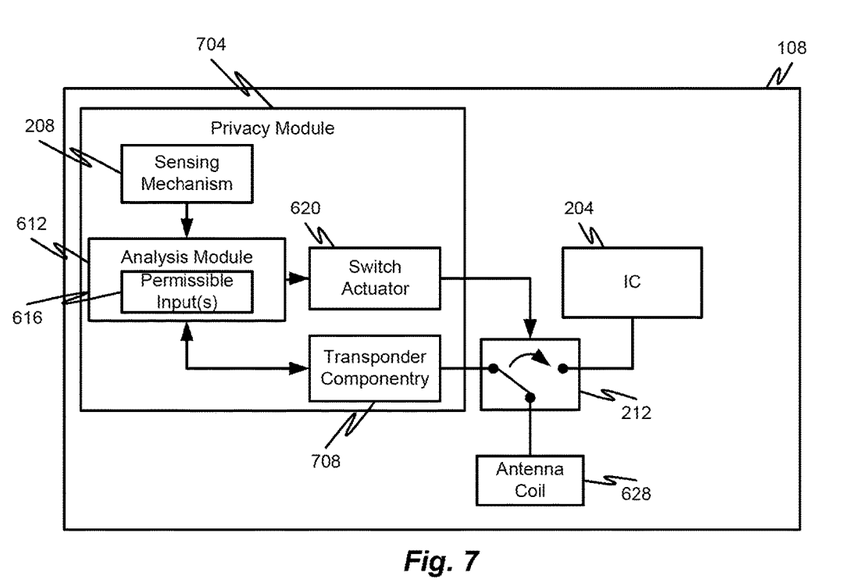
FIG. 7 is a block diagram depicting another illustrative RFID device in accordance with embodiments of the present disclosure.

FIG. 7 depicts yet another example of an RFID device 108 whereby a privacy module 704 is provided with transponder componentry 708. The privacy module 704 may be similar or identical to the privacy module 604, except that the privacy module 704 is inherently capable of RF communications.

The transponder componentry 708 may enable the privacy module 704 to exchange RF communications much like a traditional RF transponder (e.g., transponder module 608). In some embodiments, the privacy module 704 may be powered from an RF field generated by an external RFID reader (e.g., via inductive coupling). The power received from the RFID reader may be provided from the transponder componentry 708 to other components of the privacy module 704, thereby activating the privacy module 704. Once the transponder componentry 708 is activated (e.g., vis-à-vis inductive coupling with an RF interrogation circuit as defined in one or more of ISO 14443, the entire contents of which are hereby incorporated herein by reference), the sensing mechanism 208 may be activated and enabled to detect motions of the RFID device 108. Likewise, once the transponder componentry 708 is activated, the analysis module 612 may be activated and enabled to analyze motion inputs received at the sensing mechanism 208. Advantageously, this enables the analysis module 612 to be programmed with new permissible inputs 616 without requiring the IC 204 to be connected to the antenna coil 628 or otherwise be activated. In other words, the privacy module 704 may comprise the ability to be powered from an external RF field and then may utilize a microprocessor and non-volatile memory as part of the transponder componentry 708 so that the analysis module 712 can communicate with an external device (e.g., via RF, Bluetooth, NFC, etc.). This enables the analysis module 712 to receive programming instructions (e.g., in the form of motions to be programmed as permissible inputs 616). In other words, the analysis module 612 may be configured to execute an enrollment or provisioning mode of operation without exposing the IC 204 and the information contained therein.

The antenna 628, in some embodiments, may be required to be connected by the switch 212 to either the IC 204 or the privacy module 704. Both the privacy module 704 and the IC 204 may have a common ground and just the positive power connection is switched (e.g., SPST switch) or a DPST switch is used which connects both power and ground to either.

Initially, the antenna coil 628 may be connected to the privacy module 704 and then, if authorized by such, the switch 212 connects the antenna 628 to the IC 204. This way the RF Field provided by a reader powers the privacy module 704 and then, when the privacy module 704 is connected to the IC 204, the power is directed to the IC 204 and its RFID transponder componentry which behaves as if it just entered the field.

In another embodiment, there could be separate antennas for both the privacy module 704 and the IC 204 and the control of the IC 204 is executed by various methods including shorting the antenna 628 or otherwise preventing the IC 204 from receiving power, or from receiving even a logic signal that is connected to an inhibit function of the RFID transponder, or from receiving even a communications connection between each other.

In some embodiments, the IC 204 could be incorporated in to the privacy module 704 and upon successful authentication (e.g., detection of appropriate directional inputs), the IC 204 could emulate an RFID transponder. In this case, the switch 212 may not be an electronic component but a logical software function switch.

In one embodiment, the entire assembly depicted in FIG. 7 may be contained on a very thin PCB with either an etched antenna 628 or conventional antenna coil 628 attached to such PCB. Alternatively or additionally, the antenna 628 can be contained on a PCB with external connection points for a separate antenna that is affixed to such. In either case, the PCB assembly can be constructed in such a way that it can be placed inside an injection-molded conventional clamshell RFID card that is of typical size and thickness to what is typically used in RFID cards such that there is no visual difference to the user. Additionally or alternatively, the antenna 628 and switch 212 could be laminated into a card by heat or glue or otherwise such that the final assembly again has the same or similar dimensions of RFID cards as already used. Of course these assembly techniques are not just limited to cards and could be in the form factor of key-fobs, stickers to be affixed to devices, or otherwise.

The enrollment of the desired sequences can be collected on an external device and programmed into the directional sensing mechanism using RFID or even a wired connection during the manufacturing process or by electrical contacts on the card itself, similar to the contacts of a contact smart card. Additionally or alternatively, there could be an enrollment process using the assembly itself which is initiated by a pre-defined motion, push button, or otherwise. Furthermore, the functionality could employ LED's, audible mechanisms, displays, etc. to provide user feedback that a successful motion sequence has occurred and also for feedback during enrollment of the desired sequences to allow the RFID data to occur.

Figure 8A:
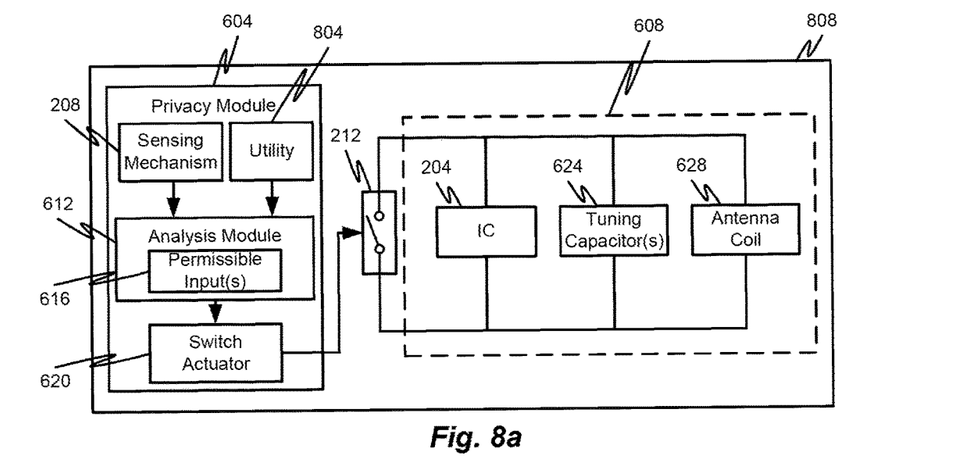
FIG. 8a is a block diagram depicting another illustrative RFID device in accordance with embodiments of the present disclosure.

With reference now to FIG. 8a, in some embodiments of an RFID communication device 808, the analysis module 612 receives an input from a utility 804 as well as from the sensing mechanism 208. The utility 804 may include, as non-limiting examples, a clock or timer, a pedometer, a GPS unit or other locating device, a microphone, or a biometric sensor, and the input received from the utility 804 may include or correspond to, as non-limiting examples, a time or a length of time, a number of steps, a geographic location, area, or boundary, a vocal command, or a fingerprint or retina scan. In these embodiments, the analysis module 612 analyzes the motion or sequence of motions detected at the sensing mechanism 208 in addition to the input received from the utility 804, and depending upon the analysis of both the motions and the utility input, invokes the switch actuator 620. The analysis module 612 may be, as non-limiting examples, software instructions executed by a microprocessor, firmware instructions, and/or a digital logic circuit (e.g., ASIC) that is configured to operate the switch actuator 620 only in response to receiving one or more permissible inputs 616 from the sensing mechanism 208 and the utility 804. Other components of the communication device 808 of FIG. 8a may operate as described previously with respect to the RFID device 108 in FIG. 6. The communication device 808 may be equipped to communicate using one or more of any known wireless communication protocols, including Bluetooth, Bluetooth low energy (BLE), NFC, WiFi, ZigBee, infrared, sound, light, RFID, etc. The communication device 808 may utilize a password protection mechanism similar to the password protection mechanisms commonly used on mobile devices (e.g. smartphones, tablets, etc.), such that the communication device 808 must be unlocked using a password before the communication device 808 may be used as described herein.

In embodiments having a clock or timer as the utility 804, the analysis module 612 may be configured to operate the switch actuator 620 only after a predetermined motion or motion sequence is detected through the sensing mechanism 208 and at, before, or after set times (e.g. after 7:00 a.m.), during a range of times (e.g. between 7:45 a.m. and 8:00 a.m.), within a set length of time (e.g. within 5 minutes) or during a range of lengths of time (e.g. between 5 minutes and 10 minutes). For example, the analysis module 612 may be configured to operate the switch actuator 620 immediately upon recognition of a predetermined motion or motion sequence, and again five minutes later. This has the effect of allowing the communication device 808 to release sensitive data contained thereon for a period of five minutes after inputting the predetermined motion or motion sequence. Possible benefits of this configuration include allowing the user of the communication device 808 to perform the predetermined motion or motion sequence in private rather than in public (e.g. if the reader to which the sensitive data will be transmitted is in a public location); minimizing the amount of time the user of the communication device 808 will need to spend at the reader 104; and allowing the user to perform the predetermined motion or motion sequence and then store the communication device 808 in a purse, pocket, or elsewhere, whether for security (e.g. so that the communication device 808 is not publicly visible) or convenience (e.g. if the user's hands will be full upon reaching the reader). Alternatively, the analysis module 612 may be configured to operate the switch actuator 620 following some period of time after recognition of a predetermined motion or motion sequence (e.g. three minutes), and then again after a certain time interval has elapsed (e.g. one minute). This configuration may be useful if, for example, the user must traverse a public setting, such a street, hallway, or elevator, before reaching the reader. As another alternative, the analysis module 612 may be configured to operate the switch actuator 620 after a threshold time has passed, and again after a second threshold time has passed, thus creating a window of time during which the switch actuator 620 may be operated.

In embodiments where the communication device 808 has a pedometer as the utility 804, the analysis module 612 may be configured to operate the switch actuator 620 immediately after detecting a predetermined motion or motion sequence through the sensing mechanism 208, and again after detecting, from data received from the pedometer, a predetermined number of steps. For example, the analysis module 612 may be configured to first operate the switch actuator 620 upon detection of a predetermined motion or motion sequence, and then to again operate the switch actuator 620 to prevent further release of sensitive data from the communication device 808 after the user has taken a particular number of steps. Alternatively, the analysis module 612 may be configured to first operate the switch actuator 620 only after detecting both a predetermined motion or motion sequence and a threshold number of steps, and then again after detecting a second threshold number of steps. Thus, a user may perform a predetermined motion or sequence of motions with the communication device 808 in a car, then exit the car and walk to the reader 104, which may be 100 steps away. The analysis module 612 may be configured to first operate the switch actuator (thus enabling the communication device 808 to transmit sensitive data) after the user has performed the predetermined motion or motion sequence and then taken 90 steps, and to again operate the switch actuator (thus preventing the communication device 808 from continuing to transmit sensitive data) after the user has taken 110 steps.

Figure 8B:
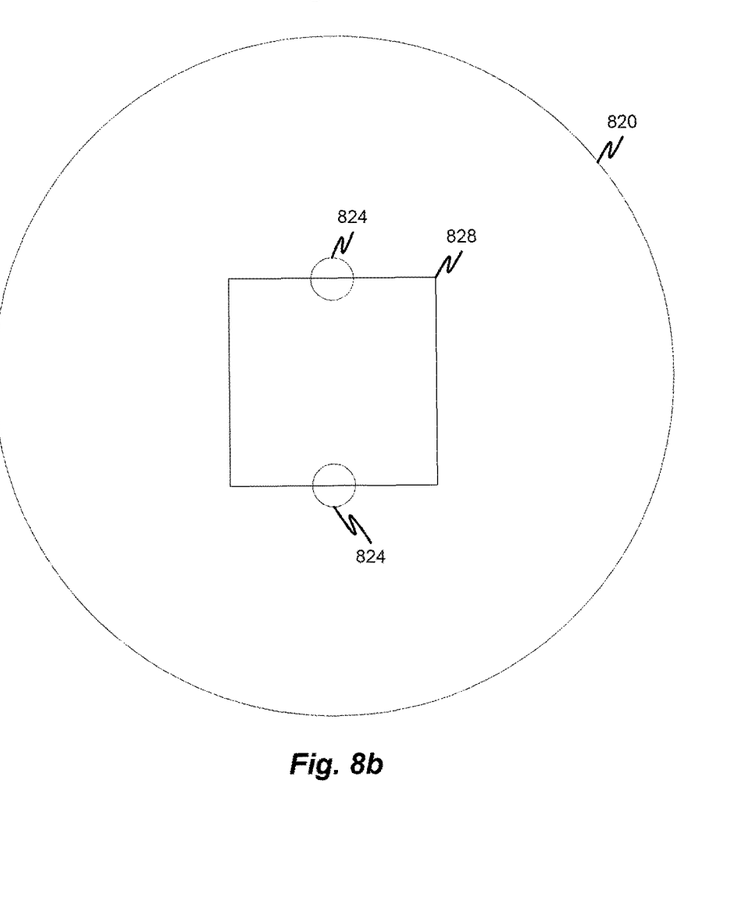
FIG. 8b is a diagram depicting certain boundaries within which a communication system may be used in accordance with embodiments of the present disclosure.

In embodiments where the communication device 808 has a GPS unit or other locating device as the utility 804, the analysis module 612 may be configured, for example, to operate the switch actuator 620 only if it detects from the sensing mechanism 208 a predetermined motion or motion sequence performed while the communication device 808 is within or without a particular geographic area, and only after the communication device 808 enters or leaves a second particular geographic area. The analysis module 612 may further be configured to again operate switch actuator 620 (e.g. to prevent further transmission of sensitive data) once the communication device 808 leaves or enters the second particular geographic area, respectively, or once the communication device 808 has crossed a geographic boundary. With respect to FIG. 8b, for example, the communication device 808 may in some embodiments be configured to only release sensitive data if the predetermined motion or motion sequence is performed within the boundary 820, (which may encompass an office building 828 and its associated parking areas), and only while the communication device 808 is within one of the boundaries 824 (which may centered around readers 104 installed next to the entry points to office building 828). In some embodiments, the predetermined geographic areas or boundaries may be independent of the location where the predetermined motion or motion sequence is performed (e.g. the geographic areas or boundaries may correspond to a fixed latitude and longitude), while in other embodiments, the predetermined geographic areas or boundaries may be dependent on the location where the predetermined motion or motion sequence is performed (e.g., the geographic areas or boundaries may be fixed in relation to the location where the predetermined motion or motion sequence is performed but correspond to varying latitudes and longitudes).

In embodiments where the communication device 808 has a microphone as the utility 804, the analysis module 612 may be configured to operate the switch actuator 620 only if it detects a predetermined motion or motion sequence from the sensing mechanism 208 and a predetermined voice (e.g. a specific individual's voice) or a vocalized password (e.g. a word or string of words spoken by any individual) from the microphone.

In embodiments where the communication device 808 has a biometric sensor as the utility 804, the analysis module 612 may be configured to operate the switch actuator 620 only if it detects a predetermined motion or motion sequence from the sensing mechanism 208 and biometric data (e.g. corresponding to a scanned fingerprint or a scanned retina) that matches predetermined biometric data (e.g. corresponding to a known fingerprint or a known retinal blood vessel pattern) from the biometric sensor.

Persons skilled in the art will appreciate that the analysis module 612 may receive input from various utilities 804, and that various combinations of utilities can be used to create customized parameters for transmission of sensitive data from the communication device 808. As just one example, a communication device 808 could be configured to require a biometric match (e.g. between a biometric scan performed by a biometric sensor and preprogrammed biometric data) before sensing mechanism 208 is used and/or useable for detecting a predetermined motion or motion sequence and before any other utility 804 is used and/or useable for detecting additional authentication data. As another example, a communication device 808 could be configured to release sensitive data only after a predetermined motion or motion sequence and a predetermined vocal command are performed in a particular geographic location, and then only for a specific period of time and only while the communication device 808 is in the same or a different particular location. Persons skilled in the art will also recognize that utilities 804 may be used together with or instead of the sensing mechanism 208 to trigger the transmission of certain messages (e.g. text messages) or the placement of certain calls (e.g. to 911 emergency services or to other predetermined numbers).

In some embodiments, the utility 804 may be physically co-located with the sensing mechanism 208 and/or the analysis module 612 (e.g. on the same piece of silicon), while in other embodiments, the utility 804 may be located remotely from the analysis module 612 and/or from the communication device 808 and configured to transmit data over a wired or wireless connection to the analysis module 612. Systems, methods, and protocols for wired and wireless communication are well known in the art, and any such systems, methods, and protocols may be used within the scope of the present disclosure.

Figure 9:
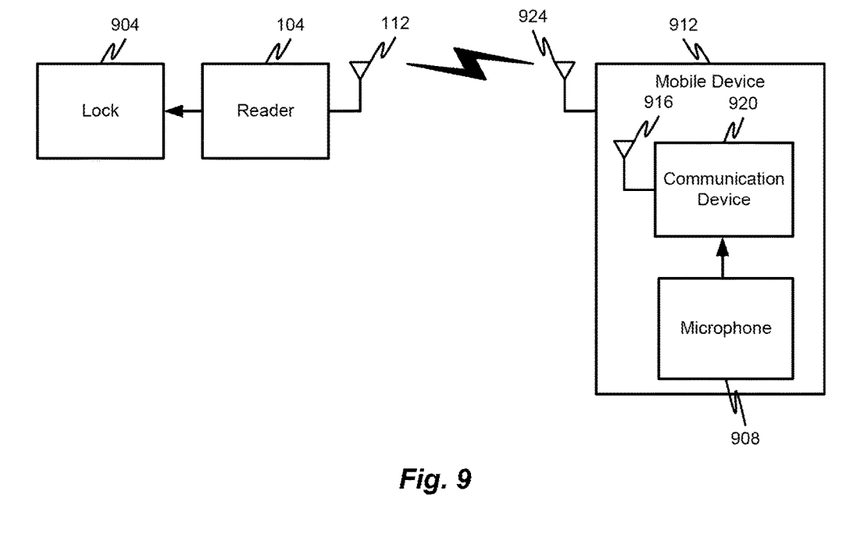
FIG. 9 is a block diagram depicting a communication system in accordance with embodiments of the present disclosure.
Figure 10:
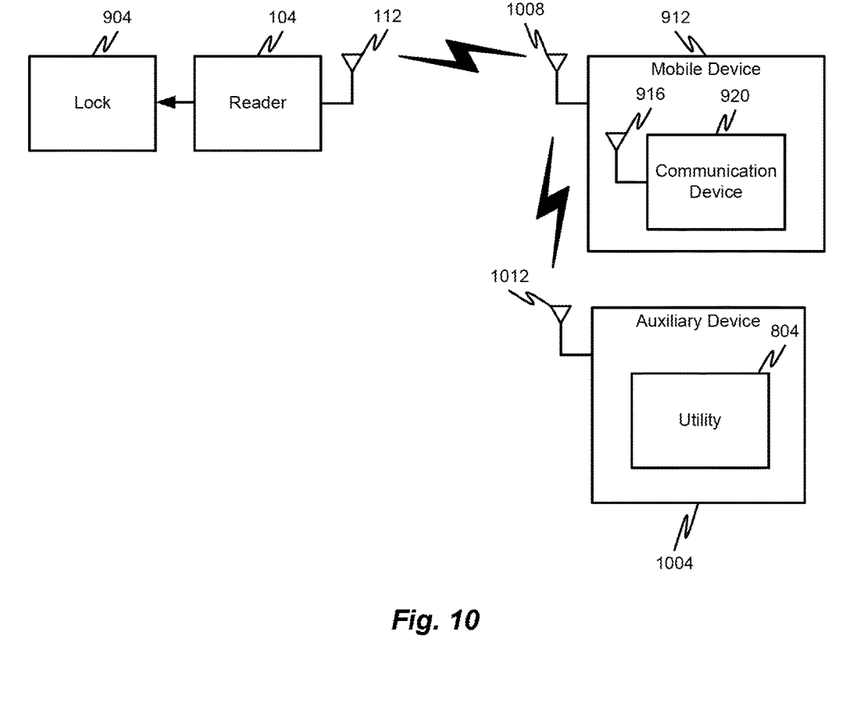
FIG. 10 is a block diagram depicting another communication system in accordance with embodiments of the present disclosure.

Although the utility 804 may be configured in some embodiments to provide data to the analysis module 612 as described above, the utility 804 may also be configured to provide data to a separate analysis module, which may in turn be configured to operate the switch actuator 620 or a separate switch actuator. Data from the utility 804 may be used to actuate the same switch or a different switch as the switch actuated based on data from the sensing mechanism 208. Detection of a predetermined motion or motion sequence through the sensing mechanism 208 may be a precondition to the analysis of any data from the utility 804, or receipt of data within certain parameters from the utility 804 may be a precondition to recognition of a predetermined motion or motion sequence through the utility 804. As non-limiting examples, a fingerprint scan or a voice command may be required to "unlock" the sensing mechanism 208 so that a predetermined motion or motion sequence can be performed. Alternatively, a communication device 808 may be configured to receive and analyze data from the utility 804 only after detecting a predetermined motion or motion sequence through the sensing mechanism 208. In still other embodiments, data from the sensing mechanism 208 may be received and analyzed independently of receipt and analysis of data from the utility 804, such that acceptable data inputs may be received and recognized in any order. In yet other embodiments, the communication device 808 may transmit the input from the utility 804 to the reader 104 so that the reader 104 can analyze the input in connection with making an access control decision for the communication device 808. With reference to FIGS. 9 and 10, in accordance with at least some embodiments of the present disclosure, access control systems 900 and 1000 include a reader 104 that controls a lock 904. The reader 104 may be physically part of or separate from the lock 904, and may be in wired or wireless communication with the lock 904. The lock 904, which may be operatively affixed to a door or any other point of access to a controlled-access resource, may be a mechanical or electronic fastening device, such as a deadbolt or an electromagnetic lock, or it may be an alarm system or other intruder detection device. The mobile device 912, which may be a smart phone, tablet, PDA, or the like, may include a communication device 920 having a structure the same as or similar to RFID device 108 or communication device 808. The mobile device 912 may also include a microphone 908. The communication device 920 is configured to receive and analyze data from the microphone 908 or from the utility 804, and, depending on the results of the analysis, to wirelessly provide credentials or other sensitive data to the reader 104. The reader 104 then conducts an authentication process using the data received from the communication device 920, and, if authentication is successful, unlocks or disarms the lock 904. In some embodiments, the communication device 920 may also send the data from the microphone 908 to the reader 104 for use in connection with the authentication process.

An auxiliary device 1004 may be may be, for example, a wristband, a smart watch, a headset, glasses, or any other wearable device. The auxiliary device 1004 typically has less processing power, less memory, less battery power, or other reduced functionality as compared to the mobile device 912, but the present disclosure also encompasses auxiliary devices 1004 with equal or greater functionality than the mobile device 912. The auxiliary device 1004 includes a utility 804 as well as an antenna 1012 for wireless communications with one or both of the mobile device 912 and the reader 104. The utility 804 may include, as non-limiting examples, a sensing mechanism 208, a timer, an accelerometer, a GPS unit or other locating device, a microphone, or a biometric sensor. Data gathered or obtained from the utility 804 may be sent to the mobile device 912 or the reader 104 for use in the authentication process.

Wireless communications in the access control systems 900 and 1000, including communications between or among the communication device 920, the mobile device 912, the reader 104, and the auxiliary device 1004, may utilize any known wireless communication protocols or signals, including Bluetooth, Bluetooth low energy (BLE), NFC, WiFi, ZigBee, infrared, sound, light, RFID, etc. The communication device 920 may have its own communication hardware, including an antenna 916, or it may be configured to communicate with the reader 104 using communication hardware on the mobile device 912, including an antenna 924 or 1008. The communication device 920 may communicate directly with the reader 104 (whether using its own communication hardware or communication hardware on the mobile device 912), or it may communicate with the reader 104 through the Internet.

In embodiments where the mobile device 912 includes a microphone 908, a user of the mobile device 912 utters a vocal command into microphone 908, and the resulting data is sent from the microphone to the communication device 920. The communication device 920 analyzes the data and, if the vocal command is recognized, initiates communication with the reader 104. Depending on the desired level of security, the access control system may be configured to require only that a particular word, string of words, or other vocalization be provided through the microphone, or it may be configured to utilize voice recognition to identify and grant access only to specific individuals based on their unique voices. The required vocal command may be adapted to reflect either configuration.

The mobile device 912 in certain embodiments is configured to run an access control app that allows a user or administrator to configure settings associated with the reader 104, the lock 904, the communication device 920, and/or the auxiliary device 1004, and/or to utilize the access control system 900 or 1000. In embodiments, the auxiliary device 1004 may also be configured to run an access control app.

Particularly (but not only) when the communication device 920 or the mobile device 912 may be in wireless communication range of multiple readers 104 and locks 904 (or when a single reader 104 controls multiple locks 904), and the user of the communication device 920 desires to open only one lock 904, each lock 904 may be associated with a particular name, identifier, or alias (e.g. "entrance," "back door," "garage," etc.). In such embodiments, the vocal command required to unlock lock 904 may include the name associated with the lock 904. As a non-limiting example, if the lock 904 is associated with the name "entrance," the vocal command required to unlock the lock 904 may be "unlock entrance." The names associated with the locks 904 may be set by the person who installs the locks 904, or may be set by a user or administrator of the locks 904 (e.g. using an access control app on the mobile device 912). If the installer determines the names, then the readers 104 to which the locks are connected may be configured to wirelessly transmit the names of the locks 904 to the mobile device 912 and/or to the auxiliary device 1004. The transmission may happen every time a communication link is established between the readers 104 and the mobile device 912 (or the auxiliary device 1004), or it may occur only when the readers 104 and/or the locks 904 are placed into an initialization or configuration mode. Additionally, the access control app may maintain a lookup table having unique connection information for each lock 904 (e.g. a MAC address or other character string) as well as the name, identifier, or alias assigned to each lock 904. In some embodiments, the access control app may act as a host app by receiving data sent from the auxiliary device 1004 to the mobile device 912 and then causing the mobile device 912 to send the same or different data to the reader 104.

In some embodiments, the utility 804 on the auxiliary device 1004 is a microphone. The auxiliary device 1004 is then configured so that when a user utters a vocal command into the microphone, the auxiliary device 1004 transmits data corresponding to the vocal command from the microphone to the communication device 920 directly or to the mobile device 912, which then provides the data to the communication device 920. The communication device 920 is configured to receive and analyze data from the microphone or other utility 804 and, depending on the results of the analysis, wirelessly provide credentials or other sensitive data to the reader 104. The reader 104 then conducts an authentication process using the data received from the communication device 920, and, if authentication is successful, unlocks the lock 904.

In other embodiments, the utility 804 on the auxiliary device 1004 is a sensing mechanism such as a sensing mechanism 208. When a user moves the auxiliary device 1004 in a predetermined motion or motion sequence, the auxiliary device 1004 transmits data corresponding to the predetermined motion or motion sequence to the communication device 920, whether directly or through the mobile device 912. As in other embodiments, the communication device 920 is configured to receive and analyze the data and, depending on the results of the analysis, initiate the authentication process with the reader 104.

As persons of skill in the art will recognize, the auxiliary device 1004 may also be configured to communicate directly with the reader 104, which may in turn analyze data received from the auxiliary device 1004 as part of the authentication process. The auxiliary device 1004 may also be equipped with a display for displaying information relevant to the authentication process, such as the amount of time remaining before the communication device 920 in mobile device 912 will transmit user credentials or other sensitive data, or the amount of time remaining before the communication device 920 in mobile device 912 will no longer transmit user credentials or other sensitive data.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of controlling the operation of an electronic device, comprising:
   receiving a first indication of a movement of the electronic device;
   receiving, at the electronic device, an input from a utility;
   determining that the movement corresponds to a predetermined and valid movement and that the input meets a predetermined input requirement;
   in response to determining that the first movement corresponds to the predetermined and valid movement and that the input meets the predetermined input requirement, providing a second indication via the electronic device or a second device;
   also in response to determining that the movement corresponds to the predetermined and valid movement and that the input meets the predetermined input requirement, generating a message at the electronic device; and
   sending the message to the second device,
   wherein the message transmitted to the second device comprises information regarding the input such that the second device can analyze the input in connection with making an access control decision for the electronic device.

2. The method of claim 1, wherein the utility is at least one of a clock or a timer, the input corresponds to at least one of a time and a length of time, and the predetermined input requirement corresponds to at least one of a threshold time, a range of times, a threshold length of time, and a range of lengths of time.

3. The method of claim 1, wherein the utility is a pedometer, the input corresponds to a number of steps, and the predetermined input requirement corresponds to at least one of a threshold number of steps and a range of numbers of steps.

4. The method of claim 1, wherein the utility is a locating device; the input corresponds to at least one of a geographic location, a geographic area, and a geographic boundary; and the predetermined input requirement corresponds to at least one of a geographic boundary and a geographic area.

5. The method of claim 1, wherein the utility is a microphone, the input corresponds to a vocal command, and the predetermined input requirement corresponds to at least one of a predetermined vocalized password and a predetermined voice.

6. The method of claim 1, wherein the utility is a biometric sensor, the input corresponds to at least one of a fingerprint scan and a retina scan, and the predetermined input requirement corresponds to at least one of a predetermined fingerprint and a predetermined retinal blood vessel pattern.

7. The method of claim 1, wherein the movement is a sequence of motions and the predetermined and valid movement is a predetermined and valid sequence of motions.

8. The method of claim 1, wherein the second device is a reader.

9. The method of claim 1, wherein the message transmitted to the second device comprises information regarding the movement such that the second device can analyze the movement in connection with making an access control decision for the electronic device.

10. The method of claim 2, wherein the second indication relates to the predetermined input requirement.

11. A communication system, comprising:
    a portable electronic device; and
    a microphone;
    wherein the portable electronic device is configured to exchange wireless communications with a second electronic device via a proximity-based Radio Frequency (RF) communication protocol, and further wherein the portable electronic device transmits one or more messages in response to receiving an input from microphone that meets a predetermined input requirement,
    wherein the input corresponds to a vocal command, the predetermined input requirement corresponds to at least one of a predetermined vocalized password and a predetermined voice, and the predetermined vocalized password includes a name corresponding to the second electronic device.

12. The communication system of claim 11, wherein the microphone is located on one of the portable electronic device and an auxiliary device in wireless communication with the portable electronic device.

13. The communication system of claim 11, wherein the name is stored in a look-up table in a memory of the portable electronic device.

14. The communication system of claim 11, wherein at least one of the portable electronic device and an auxiliary device in wireless communication with the portable electronic device receives a wireless transmission including the name of the second electronic device.

15. A method of controlling the operation of an access control device, comprising:
receiving, through a microphone, a vocal command including an identifier corresponding to a second electronic device in operable communication with an access control mechanism;
determining that the vocal command corresponds to a predetermined vocal command;
locating the identifier in a look-up table stored in a memory of a portable electronic device;
retrieving connection information correlating to the identifier from the look-up table;
using the connection information to establish a wireless connection between the portable electronic device and the second electronic device; and
sending over the wireless connection, in response to determining that the vocal command corresponds to a predetermined vocal command, a message from the portable electronic device to the second electronic device.

16. The method of claim 15, wherein the microphone is located on one of the portable electronic device, an auxiliary device in wireless communication with the portable electronic device, and an auxiliary device capable of wirelessly communicating with the second electronic device.

17. The method of claim 15, wherein the message includes information that enables the second electronic device to make an access control decision for the portable electronic device.

18. The method of claim 15, wherein the access control mechanism is at least one of a deadbolt, an electromagnetic lock, an alarm system, and an intruder detection device.

19. The method of claim 16, wherein a host app on the portable electronic device is configured to receive first data from the auxiliary device and cause the portable electronic device to send second data to the second electronic device.

20. The method of claim 16, wherein the auxiliary device is one of a wristband, a smart watch, a headset, and a pair of glasses.

21. The method of claim 15, wherein the look-up table correlates identifiers and connection information for a plurality of electronic devices in communication with access control devices, and the portable electronic device is in wireless communication range of at least some of the plurality of electronic devices in communication with access control devices.

22. The method of claim 1, further comprising:
receiving, at the electronic device, a second input from a second utility, wherein the second input is different than the input and the second utility is different than the utility; and
determining that the second input meets a second predetermined input requirement that is different than the predetermined input requirement;
wherein the providing the second indication via the electronic device or the second device occurs only if the second input meets the second predetermined input requirement.

* * * * *